No. 651,483. Patented June 12, 1900.
E. T. GREENFIELD.
PIPE OR CONDUIT FOR ELECTRICAL CONDUCTORS.
(Application filed Dec. 18, 1899.)
(No Model.)

UNITED STATES PATENT OFFICE.

EDWIN T. GREENFIELD, OF NEW YORK, N. Y.

PIPE OR CONDUIT FOR ELECTRICAL CONDUCTORS.

SPECIFICATION forming part of Letters Patent No. 651,483, dated June 12, 1900.

Application filed December 18, 1899. Serial No. 740,685. (No model.)

*To all whom it may concern:*

Be it known that I, EDWIN T. GREENFIELD, a citizen of the United States, residing at New York, borough of Manhattan, county and State of New York, have made a new and useful Invention in Pipes or Conduits for Electrical Conductors, of which the following is a specification.

My invention has for its object to make a pipe or conduit from spirally-wound strips of metal in such manner that the same shall be of a rigid nature and have a screw-threaded outer surface; and to this end it consists, first, in constructing such pipes or conduits by combining two or more spirally-wound strips of metal, one or more of which is corrugated in the direction of its length and in such manner that the corrugations form a screw-threaded exterior surface, and, second, in constructing such pipes or conduits of spirally-wound strips of metal, one or more of which is corrugated in the direction of its length, and then subjecting the completed pipe or conduit to any well-known process of zinc amalgamation.

My invention will be fully understood by referring to the accompanying drawings, in which—

Figure 1:
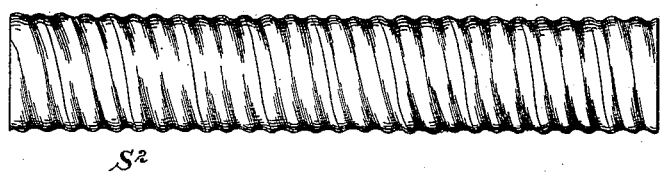
Figure 2:
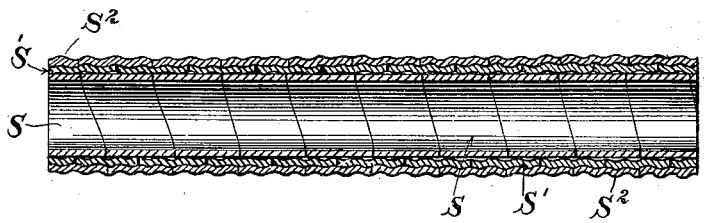

Figure 1 illustrates in side elevational view a short section of my novel pipe or conduit, and Fig. 2 is a longitudinal sectional view thereof.

Referring to the drawings in detail, S represents a spirally-wound strip of metal, preferably of thin Bessemer steel. S' represents a second similar strip of metal corrugated in the direction of its length and wound spirally and firmly around the first-named strip in such manner as to break joint therewith. $S^2$ represents a third similar strip of metal corrugated in the direction of its length and wound spirally and firmly around the strip S' in such manner as to break joints with it. The structure of this pipe or conduit is such that the interlocking windings of the corrugated strips give to it a permanent rigidity not unlike that of well-known forms of drawn metallic pipes or conduits. After the pipe or conduit is constructed as thus described it is subjected to any well-known amalgamating process with zinc, thereby coating the outer surface, or both the outer and inner surfaces, if desired, with an amalgamated coating, which unites the edges together.

I prefer to construct my novel form of pipe or conduit by mechanism like that disclosed in a prior patent, granted to me on the 8th day of August, 1899, bearing No. 630,502, adapting, of course, the dies of said machine to the plain strip S and corrugated strips S' $S^2$ in such manner as to form the pipe or conduit in the manner hereinbefore described.

A conduit when constructed as hereinbefore described has an exterior screw-threaded surface with threads of a definite pitch, which makes it possible to use it in connection with screw-threaded ends of a similar pitch or to connect its nuts with set-screws or by other means to junction-boxes and elsewhere. Such a pipe or conduit also possesses special advantages for use in buildings where it is covered by plaster, as the roughened surface acts to aid in supporting the plaster. I have ascertained that such a pipe or conduit can be more cheaply constructed than is possible with well-known processes of drawing pipes or conduits and that when so constructed it has a lateral strength which is as great as that of existing drawn pipes or conduits of similar thickness.

I do not limit myself to the use of such pipes or conduits for electrical conductors, as it is obvious that the same may be utilized in any place where similar pipes or conduits are capable of use in the arts.

In a prior patent, No. 593,842, granted to me on the 16th day of November, 1897, I have described and claimed an armored conduit-tube consisting of a flexible lining and a flexible armor composed of two or more interlocking metallic strips wound thereon, and in a subsequent patent, No. 630,501, granted August 8, 1899, I have described and claimed a metallic conduit composed of interlocking strips spirally wound together and ventilated throughout its length, the structures in both of these patents being directed especially to conduits of a flexible nature. The present invention differs from those disclosed in the before-mentioned patents in that it is directed to a metallic pipe or conduit made up of two or more spirally-wound strips so bound or united together that the completed structure is distinctly rigid, and the essence of the present invention lies in constructing a rigid metallic pipe or conduit of this nature.

Having thus described my invention, what I claim, and desire to secure by Letters Patent of the United States, is—

1. A pipe or conduit for electrical conductors composed of two or more spirally-wound strips of metal, one of which is corrugated in the direction of its length, said strips being so united together as to give permanent rigidity thereto, substantially as described.

2. A pipe or conduit for electrical conductors composed of spirally-wound strips of metal, the outer strip being corrugated in the direction of its length, said strips being so united together as to give permanent rigidity thereto, substantially as described.

3. A rigid pipe or conduit for electrical conductors composed of two or more spirally-wound strips of metal, one or more of said strips being corrugated in the direction of its length, said pipe or conduit being provided with an amalgamated coating of zinc, substantially as described.

4. A rigid pipe or conduit for electrical conductors composed of a flat spirally-wound strip of metal and an outer spirally-wound strip which is corrugated in the direction of its length, said pipe or conduit being provided with an amalgamated coating of zinc, substantially as described.

5. A pipe or conduit for electrical conductors composed of two or more spirally-wound strips of metal, the outer one of which is corrugated in the direction of its length and so constructed that the outer surface of the completed pipe or conduit is screw-threaded throughout its entire length, said strips being so united together as to give permanent rigidity thereto, substantially as described.

In testimony whereof I have hereunto subscribed my name this 15th day of December, 1899.

EDWIN T. GREENFIELD.

Witnesses:
WM. T. RUETE,
C. J. KINTNER.